US008173116B1

(12) United States Patent  (10) Patent No.: US 8,173,116 B1
Buzzi  (45) Date of Patent: May 8, 2012

(54) BIODEGRADABLE BIOCOMPATIBLE CARRIER FOR USE IN ARTIFICIAL FISH BAIT

(75) Inventor: William R. Buzzi, St. Augustine, FL (US)

(73) Assignee: Carr Specialty Baits, Inc., St. Augustine, FL (US)

( * ) Notice: Subject to any disclaimer, the term of this patent is extended or adjusted under 35 U.S.C. 154(b) by 403 days.

(21) Appl. No.: 12/170,096

(22) Filed: Jul. 9, 2008

Related U.S. Application Data

(60) Provisional application No. 60/948,615, filed on Jul. 9, 2007.

(51) Int. Cl.
  *A01N 25/00* (2006.01)
  *A01K 85/00* (2006.01)

(52) U.S. Cl. ......... 424/84; 43/42; 106/205.01; 516/104; 516/107; 524/27; 524/55; 524/916

(58) Field of Classification Search .................. None
See application file for complete search history.

(56) References Cited

U.S. PATENT DOCUMENTS

| | | | |
|---|---|---|---|
| 3,875,302 A | 4/1975 | Inoue | |
| 4,245,420 A | 1/1981 | Carr | |
| 4,463,018 A | 7/1984 | Carr | |
| 4,576,821 A | 3/1986 | Smith et al. | |
| 4,664,857 A | 5/1987 | Nambu | |
| 4,666,717 A | 5/1987 | Smith et al. | |
| 4,731,247 A * | 3/1988 | Wolford et al. ................... 426/1 |
| 4,826,691 A | 5/1989 | Prochnow | |
| 5,089,277 A | 2/1992 | Prochnow | |
| 5,170,580 A | 12/1992 | Rosenblatt | |
| 5,270,044 A | 12/1993 | Fulmer et al. | |
| 5,276,993 A | 1/1994 | Rosenblatt | |
| 5,506,290 A * | 4/1996 | Shapero ....................... 524/389 |
| 5,554,658 A | 9/1996 | Rosenblatt | |
| 5,554,659 A | 9/1996 | Rosenblatt | |
| 5,646,206 A * | 7/1997 | Coffin et al. ................... 524/27 |
| 6,174,525 B1 * | 1/2001 | Kelley ........................... 424/84 |
| 6,753,004 B2 | 6/2004 | Ollis et al. | |

OTHER PUBLICATIONS

Arfsten, D.P. et al. "Assessment of the Aquatic and Terrestrial Toxicity of Five Biodegradeable Polymers," *Environmental Research*, 2004, pp. 198-210, vol. 94.
Chiellini et al., "Biodegradation of Poly(vinyl alcohol) Based Materials", *Progress in Polymer Science*, 2003, pp. 963-1014, vol. 28.
DeMerlis et al., "Review of the Oral Toxicity of Polyvinyl Alcohol (PVA)", *Food and Chemical Toxicology*, 2002, pp. 319-326, vol. 41.
Flieger et al., "Biodegradable Plastics from Renewable Sources", *Folia Microbiol.*, 2003, pp. 27-44, vol. 48.
Grogan, "Emergent Mechanistic Diversity of Enzyme-Catalysed β-Diketone Cleavage", *Biochem. J.*, 2005, pp. 721-730, vol. 388.
Hassan et al., "Diffusional Characteristics of Freeze/Thawed Poly(vinyl alcohol) Hydrogels: Applications to Protein Controlled Release from Multilaminate Devices", *European Journal of Pharmaceutics and Biopharmaceutics*, 2000, pp. 161-165, vol. 49.
Hassan et al., "Cellular PVA Hydrogels Produced by Freeze/Thawing", *Journal of Applied Polymer Science*, 2000, pp. 2075-2079, vol. 76.
Hassan et al., "Structure and Applications of Poly(vinyl alcohol) Hydrogels Produced by Conventional Crosslinking or by Freezing/Thawing Methods", *Advances in Polymer Science*, 2000, pp. 37-65, vol. 153.
Hassan et al., "Structure and Morphology of Freeze/Thawed PVA Hydrogels", *Macromolecules*, 2000, pp. 2472-2479, vol. 33.
Kelly et al., "Subchronic Toxicity Study in Rats and Genotoxicity Tests With Polyvinyl Alcohol", *Food and Chemical Toxicology*, 2003, pp. 719-727, vol. 41.
Mandal et al., Poly(d,1-Lactide-Co-Glycolide_Encapsulated Poly (Vinyl Alcohol) Hydrogel as a Drug Delivery System, 2002, *Pharmaceutical Research*, pp. 1713-1719, vol. 19, No. 11.
Peppas et al., "Hydrogels in Biology and Medicine: From Molecular Principles to Bionanotechnology", *Advanced Materials*, 2006, pp. 1345-1360, vol. 18.
Peppas et al., "Physicochemical Foundations and Structural Design of Hydrogels in Medicine and Biology", *Annual Review of Biomedical Engineering*, 2000, pp. 9-29, vol. 2.
Sakazawa et al., "Symbiotic Utilization of Polyvinyl Alcohol by Mixed Cultures", *Applied and Environmental Microbiology*, 1981, pp. 261-267, vol. 41, No. 1.
Saxena, "Polyvinyl Alcohol (PVA)," *Chemical and Technical Assessment*, 2004, Food and Agricultural Organization of the United Nations (FAO), Food Quality and Standards Service, Joint FAO/World Health Organiztion Expert Committee on Food Additives.
Shimao et al., "The Gene pvaB Encodes Oxidized Polyvinyl Alcohol Hydrolase of *Pseudomonas sp.* Strain VM15C and Forms an Operon With the Polyvinyl Alchohol Dehydrogenase Gene pvaA", *Microbiology*, 2000, pp. 649-657, vol. 146.
Taylor, Polyvinyl Alcohol, International Programme on Chemical Safety. World Health Organization Food Additives Series: 52.
Vaclavkova et al., "Novel Aspects of Symbiotic (Polyvinyl Alcohol) Biodegradation", *Applied Microbiology and Biotechnology*, 2007, pp. 911-917, vol. 76. Wan et al., "Optimizing the Tensile Properties of Polyvinyl Alcohol Hydrogel for the Construction of a Bioprosthetic Heart Valve Stent", *Journal of Biomedical Materials Research*, 2002, pp. 854-861, vol. 63.
Yamane et al., Predicting Fate of Chemicals Based on a Quantity of Degrading Microorganisms Determined by Real-Time PCR, [Abstract P794]. *Society of Environmental Toxicology and chemist's 23rd Annual Meeting*, 2002.
Department of Health and Human Services, U.S. Food and Drug Administration. Center for Food Safety and Applied Nutrition, Office of Food Additive Safety. Agency Response Letter; GRAS Notice No. GRN 000141, Apr. 28, 2004.

* cited by examiner

*Primary Examiner* — Carlos Azpuru
*Assistant Examiner* — David Browe
(74) *Attorney, Agent, or Firm* — Womble Carlyle Sandridge & Rice, LLP

(57) ABSTRACT

The subject matter disclosed herein relates generally to a biocompatible, biodegradable, and moldable plastic carrier for a fish attractant or stimulant suitable for use as a component of an artificial fish bait. The carrier comprises one or more grades of poly(vinyl alcohol), a plasticizer, a humectant, and water. It may additionally contain one or more of the following additives: fish olfactory/gustatory stimulants, visually stimulating colorants, preservatives, scrim, and biodegradation enhancers. The present subject matter additionally relates to a method for the production of such carriers and fish bait or lures incorporating the carrier.

13 Claims, 2 Drawing Sheets

BIODEGRADABLE BIOCOMPATIBLE CARRIER FOR USE IN ARTIFICIAL FISH BAIT

CROSS-REFERENCE TO RELATED APPLICATIONS

The present application claims priority to U.S. Provisional Patent Application No. 60/948,615, filed Jul. 9, 2007, the disclosure of which is incorporated herein be reference in its entirety.

FIELD OF THE INVENTION

The invention relates generally to a molded article with a polymer-based composition. More particularly, the invention relates to a molded polymeric article that is suitable as a carrier for fish attractants, which maintains the structural integrity of traditional carriers but benefits from being biocompatible, biodegradable, and better able to store and gradually release fish attractants to function as an artificial bait.

BACKGROUND OF THE INVENTION

Artificial baits are commonly used in fishing due to their convenience and ease of use. Artificial baits are commercially available in many shapes and colors, and can be made to realistically simulate the appearance of live bait by using materials that have the soft texture of real food and molding the materials into shapes resembling fish, shrimp, worms, insects, and other, similar natural fish foods. The vast majority of all such soft plastic fishing products on the market are composed of polyvinyl chloride (PVC); however, PVC is not biodegradable or water-soluble, and thus may persist in the environment indefinitely. The PVC used for such applications is not biocompatible. Moreover, noxious and/or toxic plasticizers and cross-linkers are often used to make the PVC soft and pliable. Thus, the long-term presence of such PVC-based articles lost in bodies of water and/or swallowed by marine and other animals is a valid environmental concern. Still further, due to its hydrophobic nature, PVC is not capable of holding and releasing significant quantities of water-soluble feeding stimulants to attract fish.

For these reasons, an alternative composition for the construction of articles suitable for use as carriers of fish attractants would be desirable. It would be advantageous to provide a carrier for fish attractants that would have one or more of the following properties: biocompatibility, biodegradability, and/or more permeability to allow for containment and gradual release of significant amounts of fish attractants from the material. The present invention meets these needs.

SUMMARY OF THE INVENTION

The invention provides a shaped polymeric article which combines the characteristics of biocompatibility, biodegradability, and hydrophilicity and which allows for the containment and subsequent gradual release of significant amounts of fish attractants. Additionally, the polymeric article may be molded into any desired shape. The resulting plastic product may therefore function as an efficient carrier for fish feeding stimulants, with potential application as an artificial fish bait.

In one aspect, the invention particularly provides a biocompatible, biodegradable plastic carrier for a fish attractant or stimulant that is suitable for use as a component of a fish lure or bait. In some embodiments, a carrier according to the invention comprises about 5% to about 25% by weight of polyvinyl alcohol (PVA). Preferentially, the PVA has a molecular weight of about 31,000 to about 186,000, a degree of polymerization of about 350 to about 2,200, and a degree of hydrolysis of about 90% to about 100%. In specific embodiment, the PVA may comprise a blend of two or more different grades of polyvinyl alcohol. For example, the two grades of PVA may have different molecular weights, different degrees of hydrolysis, or both different molecular weights and different degrees of hydrolysis.

In addition to the PVA, the inventive carrier may also comprise further components, such as humectants and plasticizers. In one embodiment, the carrier comprises about 0.5% to about 10% by weight of a humectant. In another embodiment, the carrier comprises about 0.25% to about 10% by weight of a plasticizer. In further embodiments, the remainder of the carrier may be comprised predominately of water. For example, the carrier may comprise about 12.5% to about 94% by weight of water.

Notably, the composition of the polymeric carrier is substantially free of cross-linking initiators. Optionally, in further embodiments, the carrier may include additional components, such as fish olfactory/gustatory stimulants/attractants, visually stimulating colorants, preservatives, scrim, degradation enhancers, and combinations thereof.

In addition to a carrier material, the present invention also encompasses a fish lure or bait that can be prepared using the carrier material. In certain embodiments, the invention provides a biocompatible, biodegradable fish lure or bait comprising at least one polyvinyl alcohol material. Preferably, the PVA material has a molecular weight of about 31,000 to about 186,000, a degree of polymerization of about 350 to about 2,200, and a degree of hydrolysis of about 90% to 100%. Specifically, the fish lure or bait may comprise about 5% to about 25% by weight polyvinyl alcohol.

In further embodiments, the fish lure or bait may be formed of a polyvinyl alcohol comprising a blend of two or more different grades of polyvinyl alcohol. Specifically, the different grades may have one or both of different molecular weights and different degrees of hydrolysis.

The fish lure or bait of the invention can further comprise additional materials including, but not limited to, humectants and plasticizers. Preferably, the fish lure or bait also comprises at least one fish olfactory/gustatory stimulant.

In another aspect, the present invention is also directed to a process for manufacturing a polymeric carrier and/or a fish bait or lure, such as described herein. In particular embodiment, the process comprises mixing all or most of the above-noted components; heating the component mixture (preferably with stirring) to dissolve the water-soluble components; adding any additional ingredients as desired; pouring or injecting the resulting aqueous mixture into a mold device; solidifying the mold-cast article at a suitable temperature (e.g., about $-5°$ C. and about $-60°$ C.); and thawing the frozen molded product, such as at ambient temperature.

BRIEF DESCRIPTION OF THE DRAWINGS

Figure 1:
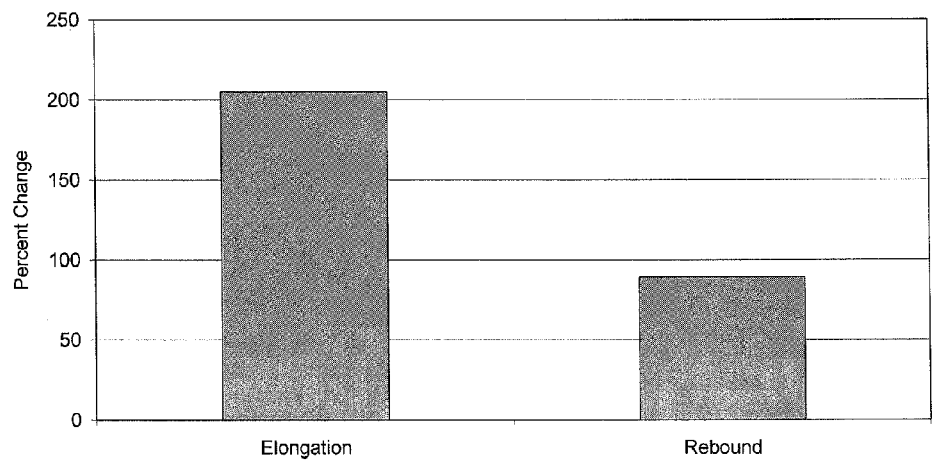
Figure 2:
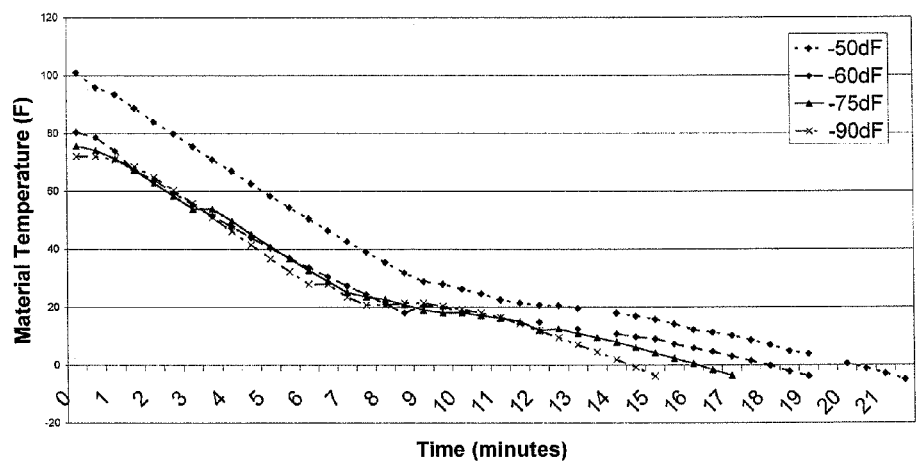
Figure 3:
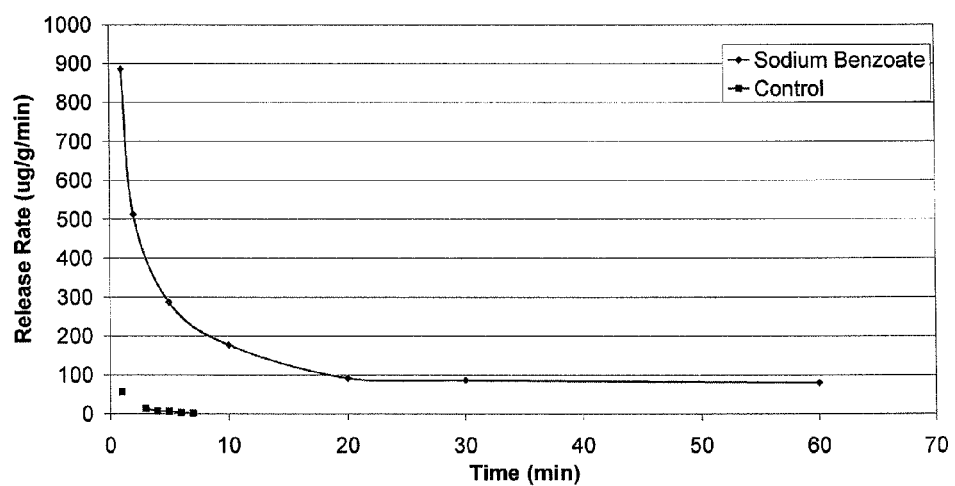

Having thus described the invention in general terms, reference will now be made to the accompanying drawing, which is not necessarily drawn to scale, and wherein:

FIG. 1 illustrates elongation and rebound of fish bait materials prepared according an embodiment of the present invention;

FIG. 2 illustrates the temperature of a fish bait material according to an embodiment of the invention over time for the four different freezing chamber temperatures; and FIG. 3 illustrates the release profiles of a control material (no sodium benzoate) and a test material (with sodium benzoate) using formulations according to an embodiment of the present invention.

DETAILED DESCRIPTION OF THE INVENTION

The invention now will be described more fully hereinafter through reference to various embodiments. These embodiments are provided so that this disclosure will be thorough and complete, and will fully convey the scope of the invention to those skilled in the art. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The subject matter disclosed herein relates to physically cross-linked, polyvinyl alcohol (PVA)-based articles that are biocompatible, biodegradable, and able to hold and release significant amounts of fish feeding stimulants. The PVA-based articles are particularly suitable as carriers for fish attractants and are therefore useful in the preparation of artificial fishing bait.

Polyvinyl alcohol (PVA or PVOH) is a thermoplastic resin obtained from the polymerization of vinyl acetate. The polyvinyl acetate may then be subjected to varying degrees of hydrolysis, which removes acetate groups to give polyvinyl alcohol. Many grades of PVA are currently available in commercial quantities. Different grades of PVA may be characterized, in part, by the molecular weight of the PVA polymer, the degree of polymerization of the base vinyl acetate monomer, and the degree of hydrolysis (molar percent hydrolysis) of acetate groups to alcohol side chains.

Degree of polymerization, degree of hydrolysis, and molecular weight are three fundamental characteristics of PVA that affect the chemical nature of the PVA molecule. As discovered according to the present invention, these characteristics can be manipulated so that polymers with a wide range of chemical characteristics can be prepared, thus resulting in specific PVA-based carriers that are specifically useful as artificial baits according to the invention. The molecular weight of the polymer is derived from both the degree of polymerization and the degree of hydrolysis.

Degree of polymerization of a polymer affects solubility, viscosity, flexibility, adhesive strength, tensile strength, rate of dissolution, and hydrophilicity. Degree of hydrolysis of a polymer affects resistance to water and solvents, solubility, flexibility, and dispersing power. In particular, PVA with a higher degree of hydrolysis is typically a stronger material, while PVA with a lower degree of hydrolysis is often tacky and elastic, with lower strength. The internal pore size of a material comprised of PVA is also affected by the degree of hydrolysis; the greater the degree of hydrolysis, the lower the pore size of the material. Thus, the greater the degree of hydrolysis of the PVA, the lesser the amount of weeping or release of water contained within the polymeric article.

Commercially available grades of PVA may have both varying degrees of polymerization and varying degrees of hydrolysis. It is also possible to blend together one or more grades of commercially available PVA to approximate the characteristics of other PVA grades that may not be commercially available. It is thus possible to prepare specialized PVA mixtures having particularly desired molecular weights, degrees of polymerization, and degrees of hydrolysis.

Polyvinyl alcohol has found a variety of uses in biomedical research due to its low toxicity. Current areas of interest in biomedical research include investigating the use of PVA as scaffolding for such applications as in situ tissue regeneration, ocular implants, and cartilage replacement. Additionally, studies have been conducted to examine the biocompatibility of PVA taken orally. DeMerlis and Schoneker (2003) report in a review on the oral toxicity of PVA that the LD50 values of PVA are very high (in the range of 15-20 g/Kg), indicating a very low toxicity level. Further, PVA is poorly absorbed from the gastrointestinal tract, does not accumulate in the body, and is not mutagenic. This data demonstrates the biocompatibility of PVA, making it an environmentally sound choice for the articles of the present invention.

In certain embodiments, the PVA used to construct articles of the present invention may have a number average molecular weight of about 31,000 to about 186,000, preferably about 50,000 to about 150,000, and most preferably about 85,000 to about 135,000. In other embodiments, the upper limit for PVA number average molecular weight is preferably less than about 185,000, more preferably less than about 175,000, and most preferably less than about 165,000.

In certain embodiments, the degree of polymerization of the PVA used according to the invention is preferably in the range of about 350 to about 2,200, more preferably about 400 to about 2,000, and most preferably about 450 to about 1,800.

In certain embodiments, the degree of hydrolysis of the PVA may range from about 90% to about 100%, more preferably about 95% to about 100%, and most preferably from about 96% to about 97%.

In one embodiment of the invention, two grades of PVA are blended together to obtain a blend that will form an article with particularly advantageous physical characteristics. Blending two grades allows for the preparation of PVA articles with desired characteristics that are intermediate between those of commercially available grades of PVA. For example, in one embodiment, a first PVA with a molecular weight of less than about 95,000 (preferably less than about 90,000) is combined with a second PVA with a molecular weight greater than about 110,000 (preferably greater than about 120,000).

The two PVA grades having different molecular weights may be combined in a variety of ratios. The chosen ratio of PVA grades within the blend depends on both the molecular weight and the degree of hydrolysis of the PVA grades selected. Both variables must be taken into account to determine the appropriate combination to give a polymeric product with the desired characteristics. In particular, the ratio of high MW PVA to low MW PVA can be about 10:90 to about 75:25, about 15:85 to about 60:40, about 20:80 to about 50:50, or about 25:75 to about 40:60. In one specific embodiment, the mixture comprises about 25% by weight of PVA with a molecular weight of about 132,000, and about 75% by weight of PVA with a molecular weight of about 85,000.

In some embodiments, the inventive carrier comprises about 10% to about 40% by weight of a high molecular weight PVA (i.e., having a molecular weight of about 120,000 to about 186,000) and about 90% to about 60% by weight of a low molecular weight PVA (i.e., having a molecular weight of about 31,000 to about 95,000). In specific embodiments, a carrier according to the invention can be formed of a blend of two or more different grades of polyvinyl alcohol comprising about 25% by weight of a first grade of polyvinyl alcohol with a molecular weight of about 120,000 to about 186,000, a degree of polymerization of about 350 to about 2,200, and a degree of hydrolysis between about 90% and 100%, and 75% by weight of a second grade of polyvinyl alcohol with a molecular weight of about 31,000 to about 95,000, a degree of polymerization of about 350 to about 2,200, and a degree of hydrolysis between about 90% and 100%.

The polymeric carrier and fish bait according to the invention are characterized in that they are substantially free of cross-linking initiators. In other words, the composition of the invention comprises less than 0.1% by weight of cross-linking initiators. Preferably, the inventive composition is completely free of such initiators.

The amount of PVA used in the bait can vary. In certain embodiments, the total amount of PVA is at least about 5% by weight, based on the total weight of the bait composition (including stimulant). In further embodiments, the total amount of PVA is at least about 7.5% or at least about 10%. In further embodiments, the total amount of PVA is less than about 25%, less than about 20%, of less than about 15%. In specific embodiments, carrier according to the invention comprises about 5% to about 25% by weight, about 7.5% to about 20%, or about 10% to about 15% by weight of a PVA material, as described herein.

In some embodiments, a carrier according to the invention may also comprise a humectant. As used herein, the term "humectant" is intended to mean a substance that can be added to another material, that attracts moisture from the atmosphere, and that can help to retain water within the material. In certain embodiments, an article of the present invention may comprise about 0.25% to about 10% humectant by weight, based on the overall weight of the article. In further embodiments, the inventive article may comprise about 0.25% to about 1% or about 0.5% humectant by weight. Any material useful as a humectant (according to the functional definition provided above) could be used in the present invention. Non-limiting examples of humectants that may be used in the invention include any number of hydrocolloids. In one embodiment of the present invention, the humectant may be chosen from the group consisting of carrageenan, pectin, locust bean gum, gellan gum, xanthan gum, diutan gum, welan gum, microparticulate whey protein, carboxymethylcellulose, gelatin, agar, and mixtures thereof. In a preferred embodiment, the humectant is a cellulose derivative, and is most preferably carboxymethylcellulose.

In still further embodiments, a carrier according to the invention may also comprise a plasticizer. As used herein, the term "plasticizer" is intended to mean a compound that may be added to a plastic material used to form the carrier to keep it soft, flexible, pliable, and durable. In the present invention, the greater the concentration of plasticizer, the greater the degree of weeping or release of water contained within the plastic material. However, the plasticizer is advantageous in that it aids in the release of the optionally contained fish attractant by lubricating the polymeric material. In certain embodiments, a carrier according to the invention may comprise a plasticizer in an amount of about 0.25% to about 10% by weight, based on the overall weight of the carrier. In certain embodiments, the plasticizer may comprise about 1% to about 5% or about 2.5% by weight of the carrier. Any material useful as a plasticizer (according to the functional definition provided above) could be used in the present invention. In some embodiments, a plasticizer for use according to the invention may be chosen from the group of polyols and polyglycols. In specific embodiments, a plasticizer is chosen from the group consisting of glycerol, sorbitol, xylitol, triethylene glycol, polyethylene glycol, and mixtures thereof.

In other embodiments, a carrier according to the invention may also comprise a preservative. As used herein, the term "preservative" is intended to mean a compound added to the carrier material to prevent or retard spoilage. The optional preservative of the present invention may be incorporated into the carrier in an amount of 0.5% to about 5% by weight. Any material useful as a preservative (according to the functional definition provided above) could be used in the present invention. In a preferred embodiment, the optional preservative comprises a food additive approved by the United States Food and Drug Administration. More preferably, the food additive is selected from the group consisting of sodium or potassium nitrate or nitrite, sulfur dioxide, sulfites, benzoic acid, sodium benzoate, propionic acid, propionates, sorbic acid, sorbates, citric acid, lactic acid, sodium hydrogen carbonate, methyl parabens, propyl parabens, butylated hydroxyanisole (BHA), butylated hydroxytoluene (BHT), ascorbic acid, ascorbates, sodium citrate, ethylenediamine tetraacetic acid (EDTA) and salts of EDTA, propyl gallate, tert-butyl hydroquinone, butylated hydroxyanisole, and mixtures thereof.

The bait carrier material of the present invention may also optionally comprise a degradation enhancer. A review by G. Grogan (2005) illustrates the degradation of PVA by bacteria-mediated enzyme activities. Genes encoding enzymes for polyvinyl alcohol dehydrogenase and polyvinyl alcohol oxidase reside next to each other in a functional genomic bacterial operon (Shimao, et al., 2000), demonstrating the coordinated action of these enzymes in degrading polyvinyl alcohol. The polyvinyl alcohol dehydrogenase and polyvinyl alcohol oxidase work in concert with another enzyme, oxidized polyvinyl alcohol hydrolase (OPH). Through the action of OPH, the carbon backbone of PVA is cleaved, resulting in biodegradation of the PVA. Proof of in situ production of these enzymes comes from Hidefumi, et al. (2002) from data obtained on the surface waters of the Tagawa River in Tochigi, Japan. In particular, the investigators found a direct correlation ($r^2=0.999$) between the number of bacteria, *Sphingomonas capuslata*, and the number of genes encoding polyvinyl alcohol dehydrogenase.

By inclusion of certain plant-derived hydrocolloids in the carrier of the present invention, however, the biodegradability of PVA films can be enhanced. For example, inclusion of pectin, a plant-derived polysaccharide, in PVA films can result in films with enhanced biodegradability and increased strength (see U.S. Pat. No. 5,646,206, which is incorporated herein by reference). Thus, in one embodiment of the present invention, a polysaccharide degradation enhancer, most preferably pectin, is added to the carrier in an amount useful to enhance the biodegradability of the article. In certain embodiments, the polysaccharide degradation enhancer may be added in an amount of about 0.25% to about 10% by weight, based on the overall weight of the carrier.

A fish olfactory/gustatory stimulant is another optional additive that may be included within the carrier to attract fish, rendering the resulting article more useful as an artificial bait. In certain embodiments, the carrier may comprise about 0.5% to about 20% olfactory/gustatory stimulant by weight, based on the overall weight of the carrier. Any fish-attracting stimulant known in the art could be used in the carrier of the present invention. The stimulant may include, but is not limited to, finely ground fish attractants/foods such as pulverized fish, shellfish, vertebrate meat renderings, plant derived oils and extracts, synthetic nitrogenous compounds, chloride or potassium salts, monosaccharides, polysaccharides, polyols, saturated or unsaturated unbranched aliphatic carboxylic acids, and mixtures thereof.

Additionally, any visual stimulants useful in artificial fish bait to attract fish may optionally be added to the composition of the present invention to enhance the visual characteristics of the carrier. In one embodiment visually stimulating colorants, such as fluorescent and non-fluorescent colorants, colored fleck-like particles, glitter, or mixtures thereof, may be added to the carrier composition.

The PVA-based carrier may also comprise a scrim material. As used herein, the term "scrim" means a reinforcing textile material. In specific examples, scrim for use according to the invention may include particulated or shredded reinforcing fiber or sheets of woven fiber, such as cotton. Scrim may be added to reinforce the structure of the carrier of the present invention. The scrim may be present, for example, in an amount from about 0.5% to about 10% by weight, more preferably about 1% to about 2% by weight.

Of course, further additives useful in the preparation of a carrier and/or a fish bait or lure could also be used according to the invention. For examples, thickeners could be use. One example of a thickener useful according to the invention is alginic acid.

The remainder of the PVA-based carrier may comprise an aqueous solvent. In one embodiment, the solvent is water. The percent by weight of water within the carrier composition can range from about 12.5% to about 94%. The exact amount of water will depend on the concentration of the other necessary and optional components contained within the carrier.

The invention is also directed to a method for the preparation of a PVA-based carrier which is biocompatible, biodegradable, and able to hold and release significant amounts of fish feeding stimulants. A carrier prepared as described herein is a particularly suitable base component of an artificial fishing bait.

In one embodiment, the method used to make the carrier comprises the following steps. Initially, all or most of the components of the carrier material are mixed together. This initial mixture can be heated to a sufficient temperature and for a sufficient time to fully dissolve the water-soluble components of the mixture. In specific embodiments, the mixture is heated at a temperature of, for example, about 60° C. to about 100° C., and preferably about 95° C. Heating can be for a time of about 1 hour to about 3 hours, preferably about 1.5 hours to about 2 hours. Preferably, heating is carried out while continuously stirring the mixture. It is not necessary for any stimulant or plasticizer used in the composition to be present during the initial mixing and heating steps, and they can rather be added in a later step.

The heated mixture can be placed into a mold (e.g., by pouring or injecting). In specific embodiments, the mixture temperature during molding is about 65° C. to about 75° C., preferably about 70° C.

The molded material is then solidified by subjecting the material to a suitable solidifying temperature for a specific period of time. In certain embodiments, solidification is carried out by placing the mold in a freezer and cooling to a temperature of less than about 0° C., preferably about −5° C. to about −60° C. The solidification time period can vary depending upon the specific mixture used. In some embodiments, solidification is carried out for a time of at least about 8 hours. The resulting molded articles are then thawed (e.g., at ambient temperature). This can be referred to as one freeze/thaw cycle. In specific embodiments, no additional freeze/thaw cycles are required. It will be appreciated that the exact temperatures and times required will depend on the characteristics of the particular grades of PVA and the additional components within the carrier mixture.

The ability to form the finished product using only a single freeze/thaw cycle is particularly useful since the inventive method can be carried out in the substantial absence of any cross-linking initiators. In other words, the method of the invention uses less than 0.1% by weight of cross-linking initiators. Preferably, the inventive method is carried out in the complete absence of such initiators.

The article of the present invention can be formed or molded into any desired shape and size. In certain embodiments, the article may be used as a carrier for a fish attractant; therefore, it may be advantageous to mold the article into a shape resembling live fish food in order to attract fish. For example, after mixing, the heated mixture may be poured or injected into molds constructed to resemble fish, shrimp, worms, or insects. It will be recognized that the polymeric articles of the present invention can be formed into many shapes, and these shapes are not limited by the illustrations provided herein.

Thus, the present invention is also useful for providing a fish lure or bait material comprising polyvinyl alcohol. In particular embodiments, the fish lure or bait comprises one or more of a defined weight percentage of PVA, a specific combination of different PVA materials, one or more PVA materials having a defined degree of hydrolysis, one or more PVA materials having a define degree of polymerization, or any combination of the above. The fish lure or bait can also comprise various further materials, such as humectants, plasticizers, and fish olfactory/gustatory stimulants. All of these materials can be as described otherwise herein. Moreover, the fish bait or lure can comprise any of the further materials described above in relation to the carrier material.

A fish lure or bait material according to the present invention can be characterized by a number of specific physical properties. In certain embodiments, the lure or bait material has a specific elasticity (i.e., a defined degree of stretch and rebound).

As used herein, the degree of stretch refers to the length the fish lure or bait material can be stretched when put under a strain, in relation to its original length, without breaking. In specific embodiments, the lure or bait material has a degree of stretch of at least about 50%, at least about 75%, at least about 100%, at least about 125%, at least about 150%, at least about 175%, or at least about 200% of the original length of the fish lure or bait material.

As used herein, rebound refers to the percentage change in the resting length of the fish bait or lure material, in relation to the original length of the material, after being stretched under a defined strain. In certain embodiments, a fish bait or lure material of the present invention has a sufficient rebound such that the relaxed, post stretch length of the material after stretch has increased in relation to the original resting length by less than 100%, preferably less than 75%, more preferably less than 50%.

According to one embodiment, elasticity can be evaluated using the following method. A test sample can be prepared having a diameter of 5 mm (defining a Y axis of the sample) and a length of 150 mm (defining an X axis of the sample). The length along the X axis defined the original resting length of the sample. One end of the test sample can be secured in a stationary device (e.g., a stationary clamp), and the opposite end of the test sample can be placed in a moveable device (e.g., a moveable clamp). The sample can be stretched linearly along the X axis to the breaking limit or until there is no further elongation (which defines the maximally stretched length). The percent change in elongation can be calculated from the maximally stretched length and the original resting length. After stretching to the maximally stretched length, the test sample can be released from the moveable clamp and allowed to return to a resting length (which defines the relaxed, post stretch length). The rebound can be calculated from the original resting length and the relaxed, post stretch length of the sample.

The fish lure or bait material can also be characterized by its hardness. The hardness of the material can be measured on a Shore OO durometer. In preferred embodiments, the average hardness of a fish bait or lure according to the invention when measured on a certified and calibrated Shore OO durometer is about 25 to about 75, about 30 to about 70, about 35 to about 65, or about 40 to about 60.

EXAMPLES

The present invention is more particularly described in the following examples which are intended as illustrative only. Numerous modifications and variations therein will be apparent to those skilled in the art.

Example 1

Preparation of Fish Bait

The following is one example of a method for preparing a bait material according to the invention. The bait material was prepared using the materials listed in Table 1, wherein percentages are based on a weight-to-weight.

TABLE 1

| Component | Weight % |
| --- | --- |
| CELVOL ® 425 PVA (available from Celanese) | 7.0 |
| ELVANOL ® 7062 PVA (available from DuPont) | 6.0 |
| Preservative | 1.0 |
| Pectin | 1.0 |
| Carboxymethylcellulose | 0.5 |
| Stimulant | 8.0 |
| Glycerol | 2.5 |
| Water | 73.5 |

CELVOL® 425 PVA has a degree of hydrolysis of 95.5-96.5% and a molecular weight of 125,000-130,000. ELVANOL® 7062 PVA has a degree of hydrolysis of 99.4-99.8% and a molecular weight of about 132,000. The specific stimulant used was a proprietary stimulant composition available from Carr Specialty Baits, Inc. (St. Augustine, Fla.). Likewise, the specific preservative used was a proprietary preservative composition available from Can Specialty Baits, Inc. Both materials were consistent with the remaining disclosure of the fish bait materials described herein.

All of the components of the bait material except for the stimulant and glycerol were placed in a vessel and heated to 95° C. for 1 hour with constant stirring. A slurry of glycerol and stimulant was added to the molten PVA mixture, which was still at 95° C., and mixed to homogeneity. At this point, colorants or pigments may be added as desired. The mixture was then placed into suitable molds and frozen for a period longer than about 8 hours. The material was then removed from the freezer and thawed at room temperature to provide the finished bait material.

Example 2

Preparation of Fish Bait

Another bait material was prepared using the materials listed in Table 2, wherein percentages are based on a weight-to-weight. As in Example 1, the stimulant and preservative used in the present formulation were proprietary compositions available from Can Specialty Baits, Inc.

TABLE 2

| Component | Weight % |
| --- | --- |
| CELVOL ® 425 PVA (available from Celanese) | 10.1 |
| ELVANOL ® 7062 PVA (available from DuPont) | 3.4 |
| Preservative | 1.0 |
| Alginic acid | 1.0 |
| Carboxymethylcellulose | 0.5 |
| Stimulant | 8.0 |
| Glycerol | 2.5 |
| Water | 73.5 |

The two grades of PVA, preservative, carboxymethylcellulose, and alginic acid were dry mixed and then added at room temperature water while stirring. The polymer mixture, under vigorous mixing, was heated to 93° C. and held there for approximately 1 hour. In a separate container, stimulant, glycerin and an equal aliquot of water were mixed together at room temperature. After heating the polymer mixture for 1 hour, the combined stimulant, glycerol, and water where mixed into the dissolved polymer and heated for an additional 15 minutes under vigorous mixing. The finished material was injected into 5 mm by 350 mm tubes and frozen overnight. Material was also injected into 15 mm by 100 mm tubes. The next day, the formed fish baits were un-molded after thawing at room temperature.

Example 3

Mechanical Testing of Fish Bait

Tests were carried out to determine the mechanical characteristics of the bait matrix material prepared according to Example 2. Elasticity is an important characteristic in slender baits. One would rather have a material that stretches under tension and then rebounds back to good approximation of the original length than break under force or stretch and not rebound back to its original shape. Tests on elasticity and rebound were conducted as well as a test of hardness of the hydrogel.

The 5 mm diameter PVA cords prepared in Example 2 were cut into lengths of 150 mm and placed into sealed bags. Tests for elasticity were run on the 150 mm cords. The cords were stretched to their breaking limit or until there was no further elongation. The percent change in elongation was determined from the point of maximum stretch. The percent change of rebound was determined from the relaxed, post stretch length.

As illustrated in FIG. 1, the 150 mm cords were stretched an average of 205%, from a resting length of 150 mm. Rebound or recoil of the cord was approximately 90%.

The present formulation demonstrates adequate elastic characteristics. Under strain it can stretch to a considerable degree and when the strain is removed, the bait material rebounds to roughly its same dimension.

The hardness of the material was measured on material molded in 15 mm by 100 mm tubes. The average durometer reading of the material on a certified and calibrated Shore OO durometer was 47.5. In comparison, chewing gum has a Shore OO hardness of 20, a racquetball has a Shore OO hardness of 30, and a rubber band has a Shore OO hardness of 65.

Example 4

Freezing Curves of Fish Bait

Tests were carried out to determine the freezing curve of the bait matrix material prepared according to Example 2.

Freezing has long been known as a method for producing a gelled polyvinyl alcohol with elastic properties. Freezing creates physical cross-links between polymer strands. The following experiments were used to determine adequate freezing temperatures. Time to freezing was recorded as a function of freezing chamber temperatures.

Material was prepared as previously described in Example 2 and injected into polyurethane molds. Thermocouples were placed into the molds to record internal temperature of the bait material. Tests were run with the freezing chamber equilibrated to −50° F., −60° F., −75° F. and −90° F. The temperature of the material was recorded on 30 second intervals.

As seen from the data provided in FIG. 2, it is apparent that the freezing/melting temperature of the PVA formulation used is approximately 20° F. The plateau at approximately 20° F. is similar regardless of the chamber temperature and can best be described as the heat given off during the freezing of the material, also known as the latent heat of fusion.

From this data, it is evident that a chamber temperature below 20° F. (−7° C.) or lower is preferred to freeze the PVA formulation described above.

Example 5

Release Assays

The product of the present invention is particularly useful in light of its ability to release feeding stimulants and food stuffs, such as to attract fish. The following release assay was devised to monitor the release of water soluble feeding products from the bait. The assay relied on monitoring the release of sodium benzoate from a bait material. Sodium benzoate has an absorption maximum at 230 nm and can easily be monitored with an ultraviolet spectrophotometer. Bait containing sodium benzoate but not containing preservative was compared to bait containing preservative but no sodium benzoate. Otherwise, all bait material contained the constituents necessary for making a fully functional fish bait. The preservative is known to interfere to some small degree with UV spectrophotometer analysis.

The test formulation including sodium benzoate is shown below in Table 3, and a comparative formulation that was used in shown in Table 4.

TABLE 3

| Component | Weight % |
| --- | --- |
| CELVOL ® 425 PVA (available from Celanese) | 10.1 |
| ELVANOL ® 7062 PVA (available from DuPont) | 3.4 |
| Sodium benzoate | 1.7 |
| Alginic acid | 1.0 |
| Carboxymethylcellulose | 0.5 |
| Stimulant | 8.0 |
| Glycerol | 2.5 |
| Water | 72.8 |

TABLE 4

| Component | Weight % |
| --- | --- |
| CELVOL ® 425 PVA (available from Celanese) | 10.1 |
| ELVANOL ® 7062 PVA (available from DuPont) | 3.4 |
| Preservative | 1.0 |
| Alginic acid | 1.0 |
| Carboxymethylcellulose | 0.5 |
| Stimulant | 8.0 |
| Glycerol | 2.5 |
| Water | 73.5 |

Solid fish bait materials were prepared as described above using the two formulations. For the assay, 2.3 g cubes of bait material, with and without sodium benzoate, were soaked in 35 ml of filtered seawater with continuous shaking. At the end of each sampling period, the bait was removed and added to a fresh tube of seawater and the soaking assay was continued. Samples were taken at 1 min., 2 min, 5 min, 10 min, 20 min, 30 min, and the interval between 50 to 60 minutes. Following the 30 minute interval soak, the bait material was removed and placed in fresh running seawater. At 50 minutes, the bait material was returned to a fresh tube of seawater and the assay was continued until the 60 minute time point.

The release profiles are provided in FIG. 3, wherein the units of release are micrograms of sodium benzoate released per gram of bait per minute. From these release profiles it is evident that bait spiked with a water soluble molecule, in this case sodium benzoate, demonstrates a strong initial release followed by a lesser sustained release for at least an hour. The control demonstrates that other constituents of the bait are not interfering or contributing to the spectrophotometric profile.

Many modifications and other embodiments of the inventions set forth herein will come to mind to one skilled in the art to which these inventions pertain having the benefit of the teachings presented in the foregoing descriptions and the associated drawing. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A biocompatible, biodegradable plastic carrier for a fish attractant or stimulant, suitable for use as a component of a fish lure or bait, comprising:
   a) about 5% to about 25% by weight of polyvinyl alcohol having a molecular weight of about 31,000 to about 186,000, a degree of polymerization of about 350 to about 2,200, and a degree of hydrolysis of about 90% to 100%, wherein the polyvinyl alcohol comprises a blend of two or more different grades of polyvinyl alcohol having different molecular weights, different degrees of hydrolysis, or both different molecular weights and different degrees of hydrolysis;
   b) about 0.5% to about 10% by weight of a humectant;
   c) about 0.25% to about 10% by weight of a plasticizer; and
   d) about 12.5% to about 94% by weight of an aqueous solvent.

2. The carrier of claim 1, wherein the blend of two or more different grades of polyvinyl alcohol comprises about 25% by weight of a first grade of polyvinyl alcohol with a molecular weight of about 120,000 to about 186,000, a degree of polymerization of about 350 to about 2,200, and a degree of hydrolysis between about 90% and 100%, and about 75% by weight of a second grade of polyvinyl alcohol with a molecular weight of about 31,000 to about 95,000, a degree of polymerization of about 350 to about 2,200, and a degree of hydrolysis between about 90% and 100%.

3. The carrier of claim 1, wherein the humectant comprises one or more hydrocolloids.

4. The carrier of claim 3, wherein the hydrocolloids are selected from the group consisting of carrageenan, pectin, locust bean gum, gellan gum, Xanthan gum, diutan gum, welan gum, microparticulated whey protein, carboxymethyl cellulose, gelatin, agar, and mixtures thereof.

5. The carrier of claim 1 wherein the plasticizer is selected from the group consisting of glycerol, sorbitol, xylitol, triethylene glycol, polyethylene glycol, and mixtures thereof.

6. The carrier of claim 1, further comprising about 0.5% to about 10% by weight of scrim.

7. The carrier of claim 1, further comprising about 0.25% to about 10% by weight of a biodegradation enhancer.

8. The carrier of claim 7, wherein the biodegradation enhancer is a polysaccharide.

9. The carrier of claim 8, wherein the polysaccharide is pectin.

10. The carrier of claim 1, further comprising about 0.5% to about 5% by weight of a preservative.

11. The carrier of claim 10, wherein the preservative is selected from the group consisting of nitrates and nitrites of sodium and potassium, sulfur dioxide, sulfites, benzoic acid, sodium benzoate, propionic acid, propionates, sorbic acid, sorbates, sulfur dioxide, citric acid, lactic acid, sodium hydrogen carbonate, methyl parabens, propyl parabens, butylated hydroxyanisole (BHA), butylated hydroxytoluene (BHT), ascorbic acid, ascorbates, sodium citrate, ethylenediamine tetraacetic acid (EDTA) and salts thereof, propyl gallate, tert-butyl hydroquinone, butylated hydroxyanisole, and mixtures thereof.

12. The carrier of claim 1, further comprising a colorant that is visually stimulating to a fish.

13. The carrier of claim 12, wherein the stimulating colorant is selected from the group consisting of fluorescent and non-fluorescent colorants, colored fleck-like particles, glitter, and mixtures thereof.

* * * * *